(12) United States Patent
de Judicibus

(10) Patent No.: US 7,080,086 B2
(45) Date of Patent: Jul. 18, 2006

(54) INTERACTION WITH QUERY DATA

(75) Inventor: Dario de Judicibus, Rome (IT)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 09/728,095

(22) Filed: Dec. 1, 2000

(65) Prior Publication Data

US 2001/0013036 A1    Aug. 9, 2001

(30) Foreign Application Priority Data

Feb. 9, 2000   (GB) ................................ 0002807.6

(51) Int. Cl.
*G06F 17/30*  (2006.01)

(52) U.S. Cl. ........................ 707/101; 707/100; 709/224

(58) Field of Classification Search .................. 707/10, 707/100, 102, 1, 101, 3, 7, 104.1; 709/224; 700/19, 83, 159
See application file for complete search history.

(56) References Cited

U.S. PATENT DOCUMENTS

| | | | | |
|---|---|---|---|---|
| 5,519,865 A | * | 5/1996 | Kondo et al. .................. 707/1 |
| 5,630,122 A | * | 5/1997 | Kaplan et al. .............. 707/102 |
| 5,634,009 A | * | 5/1997 | Iddon et al. .................. 707/10 |
| 5,870,746 A | * | 2/1999 | Knutson et al. .............. 707/10 |
| 5,937,406 A | * | 8/1999 | Balabine et al. ............ 707/100 |
| 6,055,461 A | * | 4/2000 | Sumiyama et al. ......... 700/175 |
| 6,160,556 A | * | 12/2000 | Kinoe et al. ................ 345/419 |
| 6,401,102 B1 | * | 6/2002 | Ishii et al. ............... 707/104.1 |
| 6,625,581 B1 | * | 9/2003 | Perkowski ................... 705/27 |
| 2002/0107838 A1 | * | 8/2002 | Tsai .............................. 707/3 |
| 2002/0123984 A1 | * | 9/2002 | Prakash ......................... 707/1 |

* cited by examiner

*Primary Examiner*—Jeffrey Gaffin
*Assistant Examiner*—Hassan Mahmoudi
(74) *Attorney, Agent, or Firm*—Ido Tuchman

(57) ABSTRACT

A system cooperable with a data engine such as a database allows a user to refine a query. The query comprises at least one conditional attribute and at least one attribute to be displayed and the data engine responds to produce a report comprising one or more objects, each object comprising the displayed attributes. The system comprises a module for rendering at least one object from a report and which is responsive to user interaction with the report, for selecting one or more displayed attributes and causing the one or more displayed attributes to change to respective one or more conditional attributes. A second module renders at least one conditional attribute for a query and is responsive to user interaction with the one or more rendered conditional attributes, for selecting one or more conditional attributes and causing the one or more conditional attributes to change to respective one or more displayed attributes.

9 Claims, 7 Drawing Sheets

INTERACTION WITH QUERY DATA

FIELD OF THE INVENTION

Figure 1:
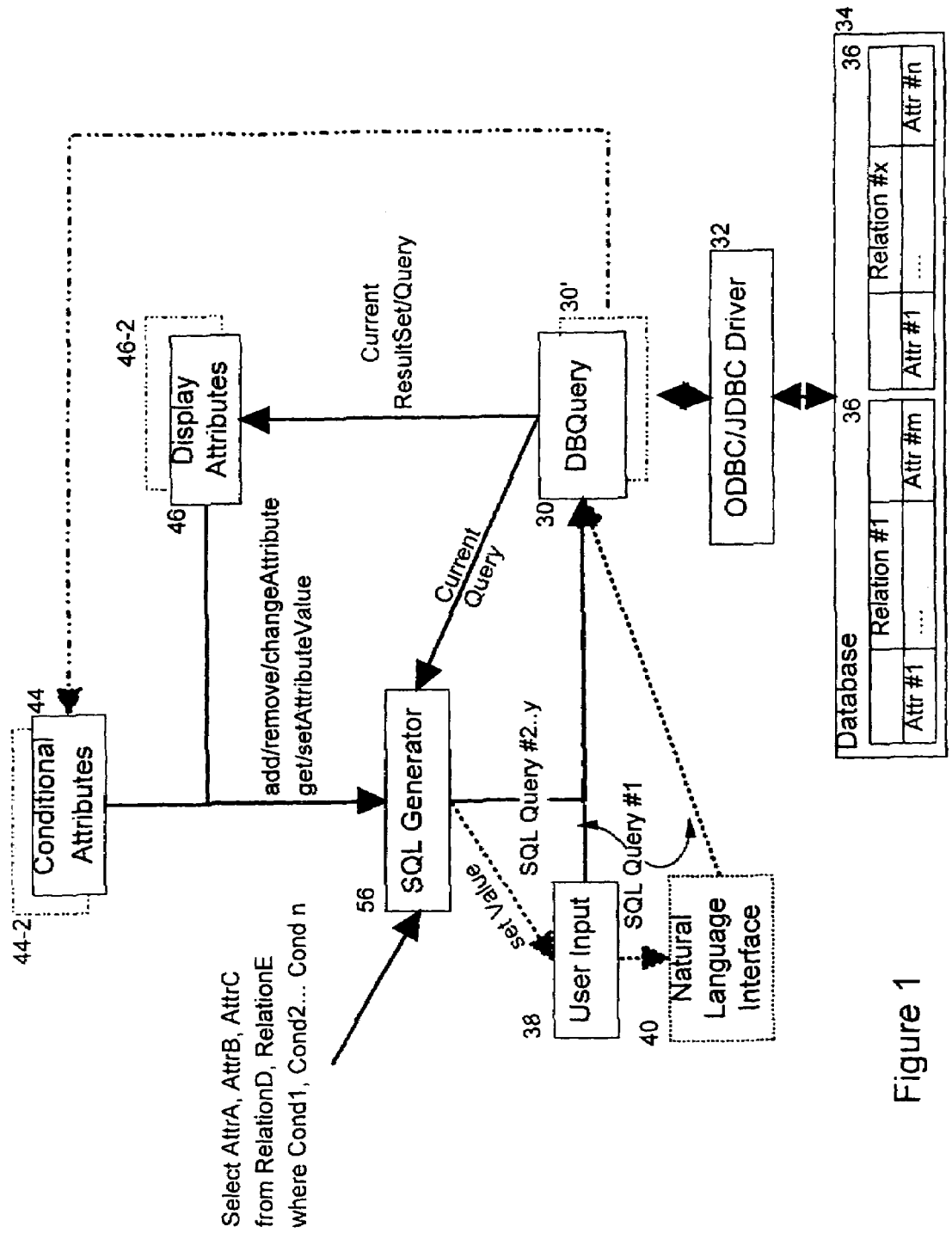

The present invention relates to a system cooperable with a data engine which allows a user to refine query data.

BACKGROUND OF THE INVENTION

A database can be considered as a multidimensional space (mD-space) where each axis corresponds to an attribute and each object occupies a point in that space. Attribute values may be finite or infinite; continuous, discrete ordinal or discrete nominal. It should be seen, however, that objects need not be valued for all attributes. Similarly, simulation engines can be thought of as operating in multi-dimensional space and queries on such engines are often phrased in the form "Show me attributes A, B and C when attribute D fulfils conditions x and attribute E fulfils conditions y".

Conventional relational databases store information in a plurality of tables (relations) with each table containing one or more objects and each object containing one or more attributes. Selecting objects in a database corresponds to identifying a subset of objects in the mD-space by specifying one or more conditions within a query. A common form of specifying a query on such databases employs a Structured Query Language (SQL). SQL queries generally take the form:

Select Display Attributes from Relations where Conditions

Where a database comprises many tables linked together through a complex network of index fields, a database query may become quite complex involving, for example, INNER-JOIN expressions. Often applications which link to databases do not expose a user to having to specify a complete SQL query, rather they take input from the user in a simple manner, for example, getting the name of a person they wish to find using a text entry field. This input is used as one of the Conditions in the above query, each condition comprising a conditional attribute name followed by an expression including a relational operator, for example, Name="Conor" or 5>Age<12. Such Conditions as well as the pre-defined Display Attributes (sometimes known as the "select list") which are to form the resultant report and the Relations from which information is drawn make up the query.

The resultant report is itself usually a relation, again comprising a number of objects conforming to the conditions and having the display attributes specified in the query. The relation is then rendered so that it can be displayed on the screen in a suitable manner—for example as a table or as a graph.

The resultant report can be thought of as a notional curve in the mD-space connecting all the objects belonging to the subset identified by the query and moving through the report is equivalent to navigating along that curve. Nonetheless, because the report is static, should the user not find the required information, they must backtrack to amend the original query before being presented with a new report.

It will be seen, however, that the user often does not have all the right information to define the best possible query initially. Thus, the user submits a query, looks at the results, modifies the query, gets the new result, and so forth. So, to get closer to the desired result requires resubmitting another query which means losing time.

Applicant's co-pending application Ser. No. GB9925741.2discloses a system enabling a user to refine a query on a database result set while retaining previous result sets, thus building up a path through which the user can both navigate around previous results and adjust criteria for further searches. This enables a user to locally move around a specific object in a multi-attribute type database space, according to one or more selected conditions, to provide fine tuning of the result obtained in a report.

It is an object of the present invention on the other hand, to enable a user to completely reconstruct a query graphically.

BRIEF SUMMARY OF THE INVENTION

Accordingly, the present invention provides a system cooperable with a data engine which allows a user to interact with a report to refine a query according to a system cooperable with a data engine which is responsive to a query, comprising at least one conditional attribute and at least one attribute to be displayed, to produce an associated report comprising one or more objects, each object comprising said at least one displayed attributes, said system comprising: first means for rendering at least one object from a report; first means, responsive to user interaction with said rendered report, for selecting one or more displayed attributes and causing said one or more displayed attributes to change to respective one or more conditional attributes; second means for rendering at least one conditional attribute for a query; second means, responsive to user interaction with said one or more rendered conditional attributes, for selecting one or more conditional attributes and causing said one or more conditional attributes to change to respective one or more displayed attributes; means, responsive to said conditional and displayed attributes, for generating a subsequent query.

The invention allows a user to change conditional attributes to display attributes and vice versa, without requiring the user to submit another query, thus changing completely the nature of a query and allowing a user to more flexibly utilise a data engine.

BRIEF DESCRIPTION OF THE INVENTION

Embodiments of the invention will now be described with reference to the accompanying drawings, in which:

FIG. 1 is a block diagram of a system according to the invention;

FIGS. 2 to 7 illustrate the display rendered by various embodiments of the system according to the invention; and Referring now to FIG. 1 which shows a block diagram of a system enabling a user to interact with a report and so refine a query according to a preferred embodiment of the invention. This embodiment is described for simplicity in terms of Java Beans cooperating with database, although it will be seen that the invention is not limited to this nor indeed object oriented languages in general nor strictly to the structure shown.

DETAILED DESCRIPTION OF THE INVENTION

In describing the operation of the system, for clarity, reference will be made to the operation of classes whereas it is to be understood that it is instances of such classes which execute at run time.

UK Application No. GB9814339.9 and corresponding U.S. application Ser. No. 09/342,775 describes a set of Java beans one of which, DBQuery 30, connects via a database driver 32 to a relational database 34. The relational database 34 comprises a plurality of tables 36, Relation #1 . . . #x, each of which store a number of attributes for a number of objects.

DBQuery comprises a number of properties including the address and type of the database and any username and password required to access the database 34. From the point of view of the present invention, two properties are relevant: Query and DBResultSet. DBQuery also exposes get and set methods enabling its properties to be read and, where possible, written by other objects.

In the present embodiment, a text entry field 38 receives user input directly defining an initial SQL query—SQL Query #1. Where the user is not expected to be familiar with such query languages, user input can be via a natural language interface 40, which receives input, for example, "Get me all red 4 wheel drive cars in your catalogue", and converts this to an initial SQL query.

Again, it should be seen that the present embodiment is described in relation to SQL and relational databases for exemplary purposes only, and it will be seen that the invention is applicable to any means for querying any data engine including databases, data stores, simulation tool or combination thereof. For example, initial input could be made from a QBE type interface or indeed initial input might be limited to only specifying conditions for a limited number of attributes with the remainder of the query being pre-defined or built automatically.

In any case, initial user input is used to set the Query attribute of DBQuery 30. This causes DBQuery 30 to link to the database 34 and generate a report which is returned as a relation called DBResultSet.

As explained in the introduction, there are two sets of attributes in any query—Conditional Attributes and Display Attributes. In the preferred embodiment, respective modules 44, 46 are provided for handling each type of attribute and each module controls a respective window, 44' and 46' for manipulation and display of such attributes, FIG. 2.

The display attributes module 46 listens for changes in DBResultSet. In response to a query causing a change in DBResultSet, the module 46 re-displays the results set. In a first example, FIG. 2, the result set comprises a relation comprising a set of objects, each having three attributes: longitude, latitude and altitude and this is displayed in the right-hand window 46' of FIGS. 2 to 5.

It will be seen that it is conventional for such a module 46 to be able to render this data as a surface with the three attributes corresponding to the x, y and z axes respectively. Before doing this, however, the module 46 should determine the scale for each attribute, and there are a number of possibilities for setting the scale of each attribute. In the present embodiment, the module 46 determines first the data type of each attribute in a result set. Then, for continuous or discrete ordinal attributes, the module 46 scans through the values for each attribute, and uses the maximum and minimum value detected as the extremes of the scale; where categorical data is detected, the module 46 preferably provides a legend for each attribute category detected in the result set.

Figure 2:
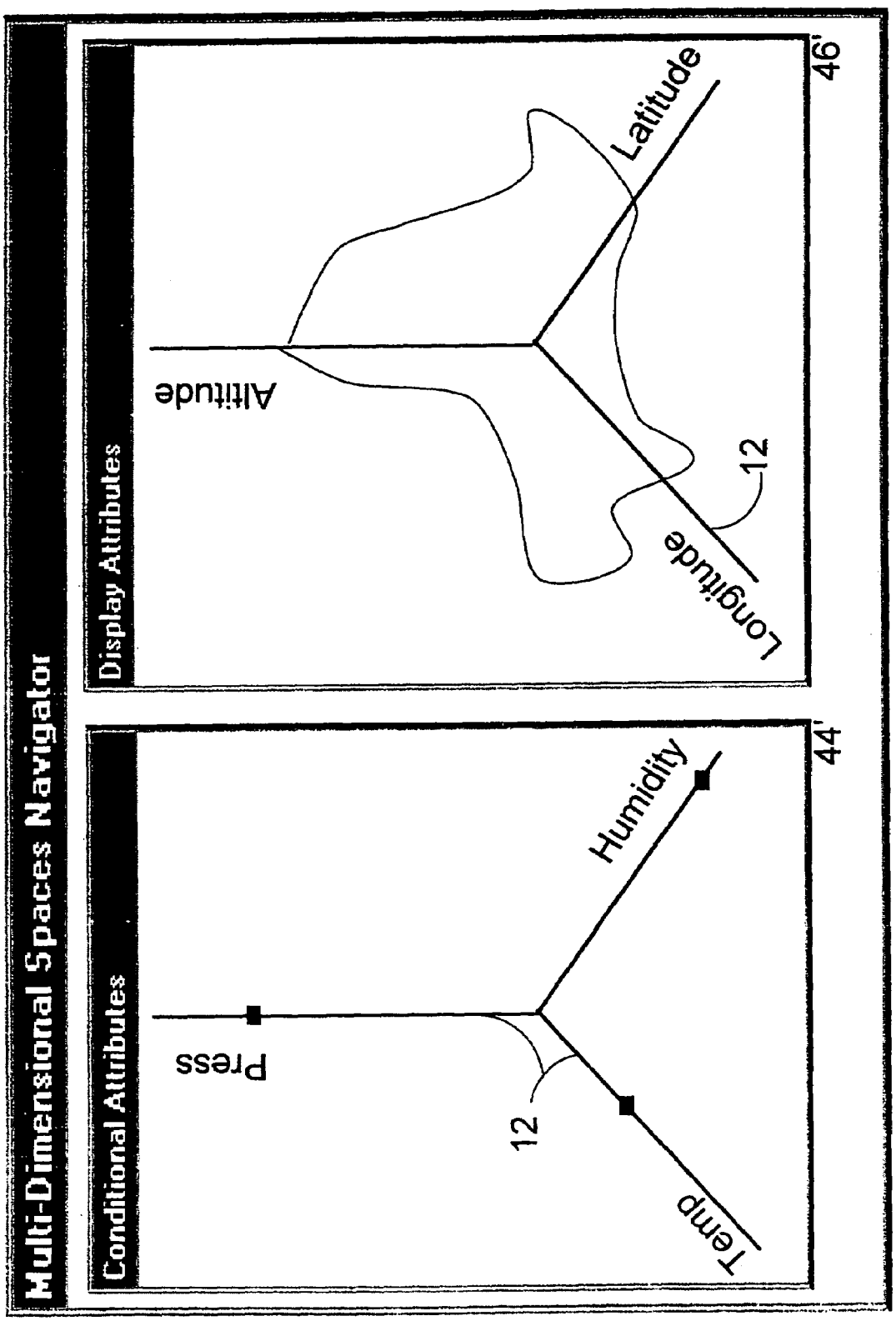
Figure 3:
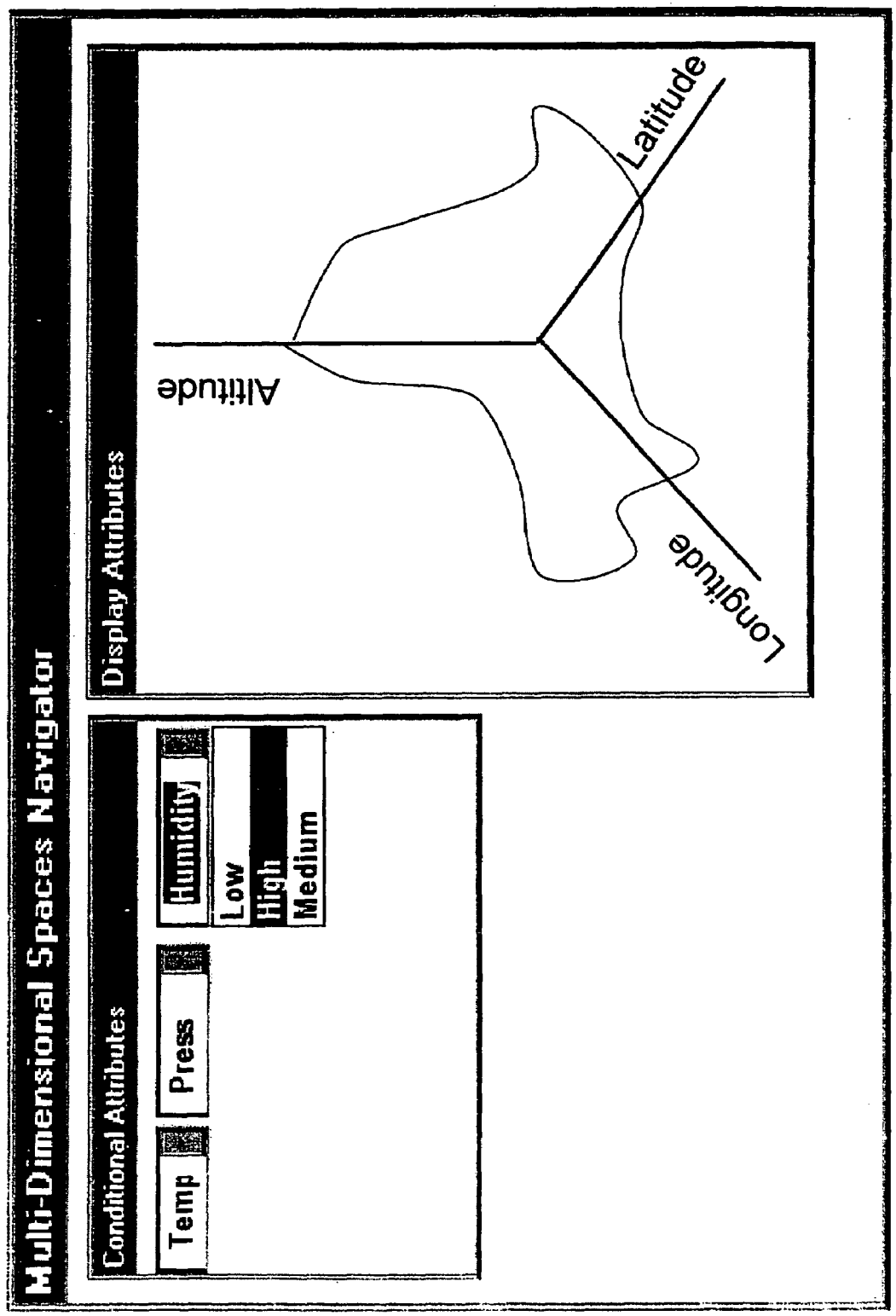
Figure 4:
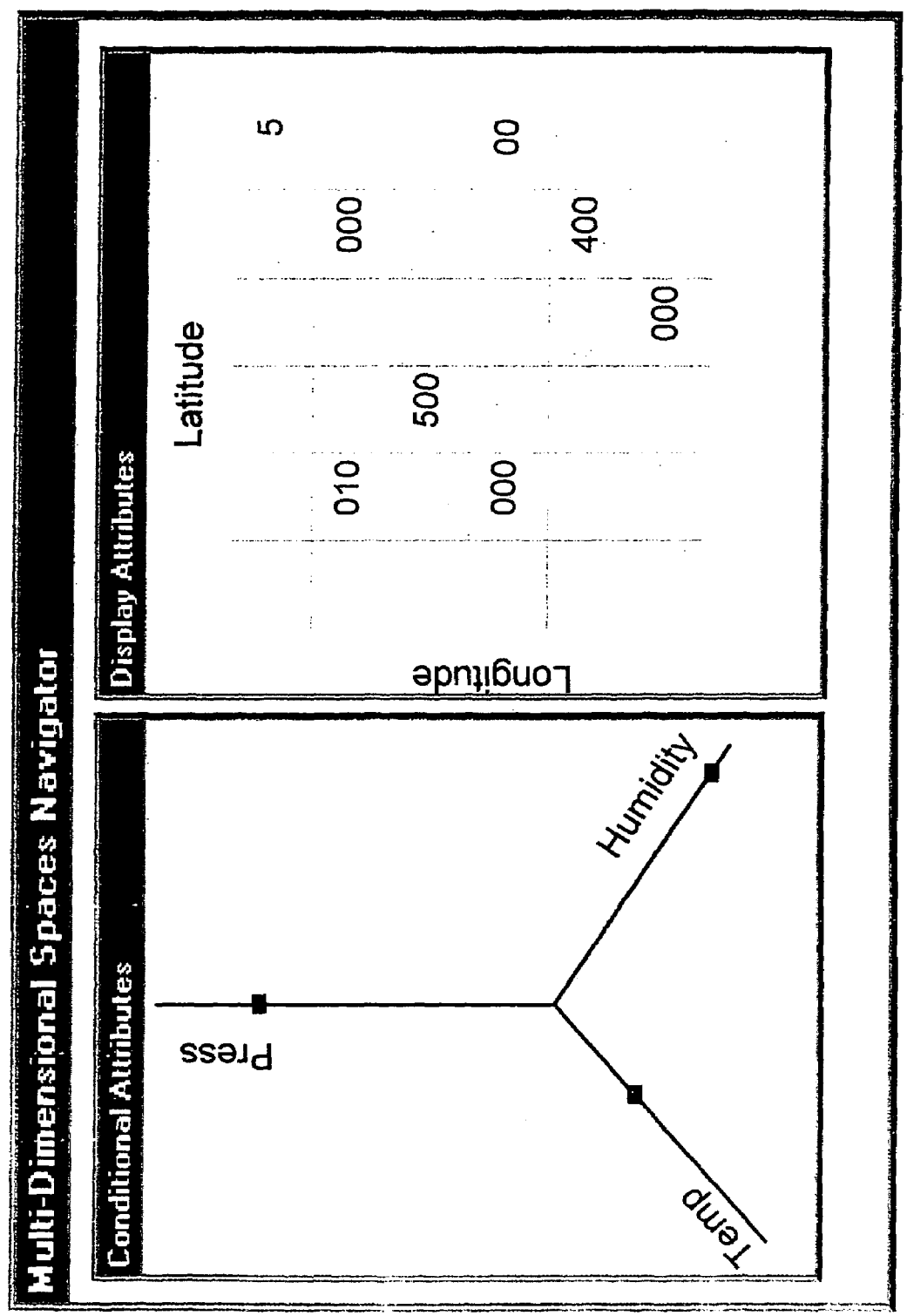

It will be seen that the style of display employed by the module 46 should be chosen to suit the attribute type. Thus, for 3-D result sets comprising ordinal type attributes, a surface is quite useful as shown in FIGS. 2 and 3, whereas for categorical or perhaps more discrete data, a table may be more useful, as shown in FIG. 4, and for more complex data a scheme of the type illustrated in FIG. 5 can be used. In any case, it should be seen that the invention is not limited to the display of only 3-D result sets. It can be seen that where a 2-D result set is produced, a bar chart or simple graph may be displayed and clearly where a 1-D result set is produced a line will only required.

Figure 5:
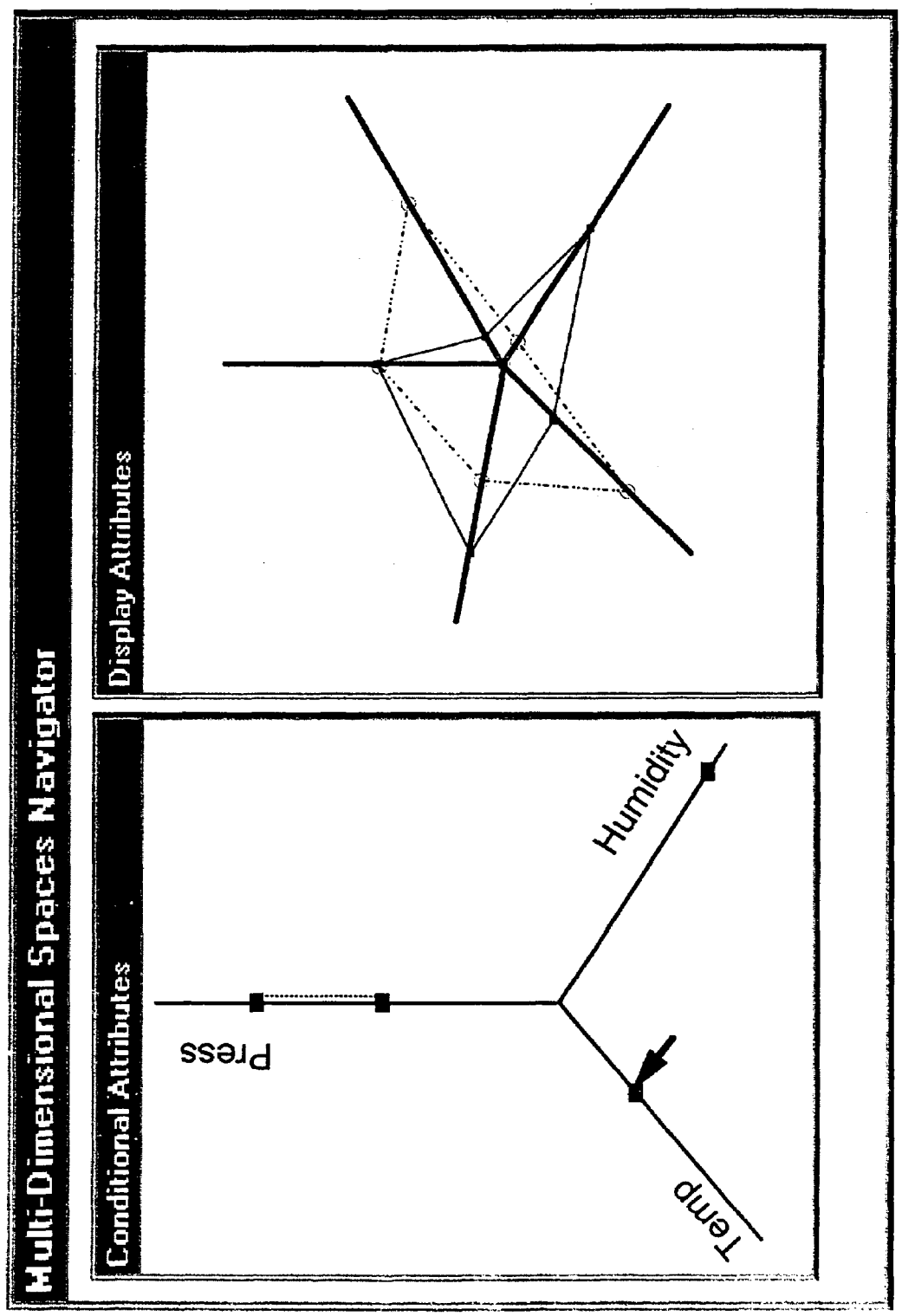

On the other hand in FIG. 5, where a result set showing 5 attributes is illustrated, it will be seen that if a result set comprises a number of objects, the display may become quite confusing. In such cases, the display module 46 could be set to only display the data for one object of the result set at a time.

In this regard, it can be seen that the display module 46 can either be implemented separately for each style of display or a single implementation may be capable of displaying the result set in a number of styles, with the style being set either internally by the module 46 in accordance with the number of objects in the result set, the number of attributes in the result set and the data type of the attributes in the result set; or externally by a controlling program containing both the modules 44 and 46.

Turning now to the conditional attributes module 44 which displays the conditional attributes used in the SQL query in the left hand window 44' of FIGS. 2 to 5. In the example of FIG. 2, the conditional attributes used are: temperature, pressure and humidity. These are rendered isometrically although it will be seen that this may not be particularly suitable for categorical type data, as in the case of humidity or attributes such as colour. Thus, in the example of FIG. 3 the module 44 displays the attributes as list boxes, from which the user may select from a list of options (as in the case of humidity). In an even simpler variation, simple entry fields are provided and the user types in a conditional attribute's value directly. Thus, it should be seen that the invention is not limited to any particular manner of displaying the conditional attributes.

Nonetheless, it should be seen that where the user is provided with the possibility of selecting from a range, in the case of an ordinal type attribute, or a candidate list, in the case of categorical attributes, the module 44 should preferably be able to indicate the available possibilities. In order to do this the module 44 can either be hard coded with the range or candidate list for each attribute, which although easily implemented is not desirable, or the module 44 can independently query the database 34 via another instance 30' of the DBQuery class.

Thus, for each conditional attribute, the module 44 formulates a simple SQL query of the form "Select Attribute from Tables", sets this as the query property of DBQuery 30', and then scans the single column relation of results to find either the range or candidate list, thus enabling the module 44 to display either the view of FIGS. 2, 4 and 5 with appropriately labelled scales or the view of FIG. 3 with an appropriate candidate list.

The names of the tables used can either be restricted to the list of tables supplied in the initial query, or another query can be used to determine first in which table a given attribute is located before searching that table.

So, it should be seen from the above that an almost infinite number of ways of rendering the conditional or display attributes can be used.

Turning now to the in use operation of the modules—both the modules 44 and 46 communicate with an SQL generator 56. The SQL generator 56 can determine the current query from DBQuery and receives appropriate method calls from the modules 44 and 46 indicating changes to attributes forming the current query. The SQL generator 56 generates the next query and this query is used to set the query attribute of DBQuery 30, which in turn produces another result set. The SQL generator may also use the query to set a new value for the text entry field 38, so confirming to the user the conditions used in the new query and perhaps teaching the user how to formulate better or more sophisticated initial queries.

The modules 44 and 46 assume that the SQL generator 56 implements an interface whereby the modules, in response to user interaction, can cause the SQL generator to alter its next SQL query by: adding or removing an attribute (either display or conditional), changing a display attribute to a conditional attribute and vice versa and setting the expression associated with a conditional attribute.

Both modules 44 and 46 are responsive to the user moving the cursor keys to select the previous and next attributes. Where the first or last attribute of either window 44', 46' are already selected, the associated module 44 or 46 transfers focus to the other module which highlights a selected attribute, and in this way the user can select any of the conditional or display attributes involved in a query. Preferably, the modules are responsive to user mouse movement so that a user can randomly, rather than sequentially, select attributes. In any case, the selected attribute is appropriately highlighted by the module 44 or 46 to provide feedback to the user. In the example of FIG. 2, such cursor movement or mouse selection can be used to select a vertex 12 corresponding to an attribute and move between vertices, with the selected vertex being highlighted as appropriate.

In a variation of the first embodiment, a tool bar (not shown) appears within (or adjacent) the windows 44', 46'. By selecting the arrows of the tool bar, the associated module is caused to navigate from one attribute to the next.

Each module 44, 46 is then further responsive either to a designated keystroke or to a mouse button being pressed to change the state of the selected attribute. (Mouse driven interaction may require pop-up menus to be displayed enabling the user to select from various options.) According to the present invention, if the state of a conditional attribute is changed, it becomes a display attribute and vice versa. This state change is communicated to the SQL generator 56, by calling the method changeAttribute and including the attribute identity and optionally its state as parameters, FIG. 1.

If changeAttribute is called from the module 44 and so needs to implement a change from a conditional to a display attribute, then the appropriate change is made on the Query property of DBQuery and a new result set obtained and displayed by the module 46. In the meantime, the module 44 deletes its display corresponding to the former conditional attribute.

If changeAttribute is called from the module 46 and so needs to implement a change from a display to a conditional attribute, the SQL generator preferably waits until an expression is set for the conditional attribute before passing the re-formulated query to DBQuery. In the meantime, the module 46 preferably re-renders the result set ignoring the deleted attribute, thus reducing the number of dimensions requiring display by one. This is useful, for example, where the module 46 is limited to displaying 3-D result sets as it indicates that a further attribute is now available for display.

In relation to determining the expression associated with a conditional attribute, in one implementation the conditional attribute module 44 reads user keyboard input directly. When a selected attribute's value is input or changed from the attribute's previous value, the module calls the setAttributeValue method on the SQL generator with the attribute name and its value being passed as parameters. setAttributeValue then re-formulates the query and passes this to DBQuery 30 whose result set is then re-displayed by the module 46.

In another implementation, the module 44 interface allows the user to click and drag along a selected vertex 12 so that the attribute value for the selected attribute can be adjusted away from the conditional attribute's previous value. In an extension of this interface, the user can indicate, either through the keyboard or through a mouse driven pop-up menu, that rather than using a simple expression including an "equals" relational operator, the user wishes to search a range and so use a complex expression. As shown in FIG. 5 for the "Pressure" attribute, the module 44 then displays two values on the pressure scale. The user then adjusts both values, before causing the module 44 to relay the expression to the SQL generator 56.

In either case, the module 44 may require the user to strike a separate key or click a mouse button to cause the module 44 to cause the SQL generator 56 to generate the next query.

It will also be seen that by extending the interface for the modules 44 and 46, it is possible to enable the user to both add or subtract attributes from query to query. Thus, when the user selects an attribute on either the window 44' or 46', a keyboard command or mouse click can cause the associated module 44, 46 to call the removeAttribute method on SQL generator. If the removed attribute is a display attribute, SQL generator does nothing and in the meantime, the module 46 re-renders the display ignoring the deleted attribute. If the attribute is a conditional attribute, the module 44 also re-renders its window 44' ignoring the deleted attribute, but in this case the SQL generator updates DBQuery and a new result set is generated and in turn re-rendered by the module 46.

Where either the window 44' or 46' is in focus and the user either through keyboard or mouse interaction indicates that they wish either to add a conditional or a display attribute, the associated module 44,46 then queries the user for the name of the attribute and then calls the addAttribute method on SQL generator with the attribute name. If the added attribute is a display attribute, then the module 46 waits for an updated result set before re-rendering its window 46'. If the added attribute is a conditional attribute, as in the case above of changing a display attribute to a conditional attribute, the SQL generator waits until the module 44 sets an expression for the attribute before re-formulating the query on DBQuery.

It should be seen that in all of the examples above, it has been assumed that the conditions are "anded". Nonetheless, it will be seen that it is possible to extend the interface for the module 44, to enable a user to specify any combination of logical operators between conditional attributes including "or", "exclusive or" etc, and furthermore to convey this through any suitable means to the SQL generator.

Finally, although the examples above have shown attributes as either control or display attributes, it will be seen that there is nothing to stop a user adding an attribute both as a control and a display attribute where such a query is required.

It should also been seen that the invention is not limited to only a single conditional or display attributes window 44', 46'. Where, for example, more than three attributes are employed then perhaps a multi-window combination of the display of FIGS. 2 to 5 could be employed.

Furthermore it can be seen that many extensions and alterations to the above described interface are possible. For example, the user may be allowed to swap a selected conditional attribute with a selected display attribute with a single command. The user may even be allowed the swap a group of conditional attributes with a group display attributes with a single command.

Figure 6:
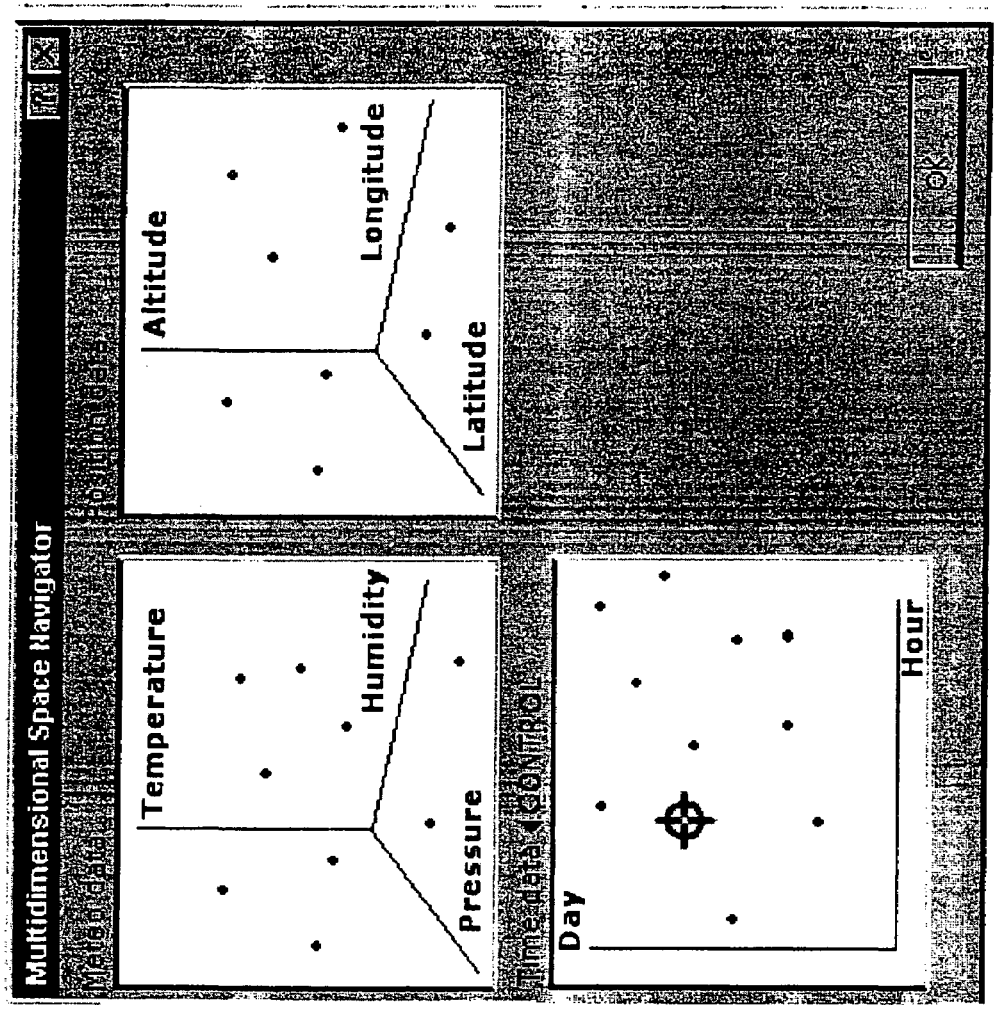
Figure 7:
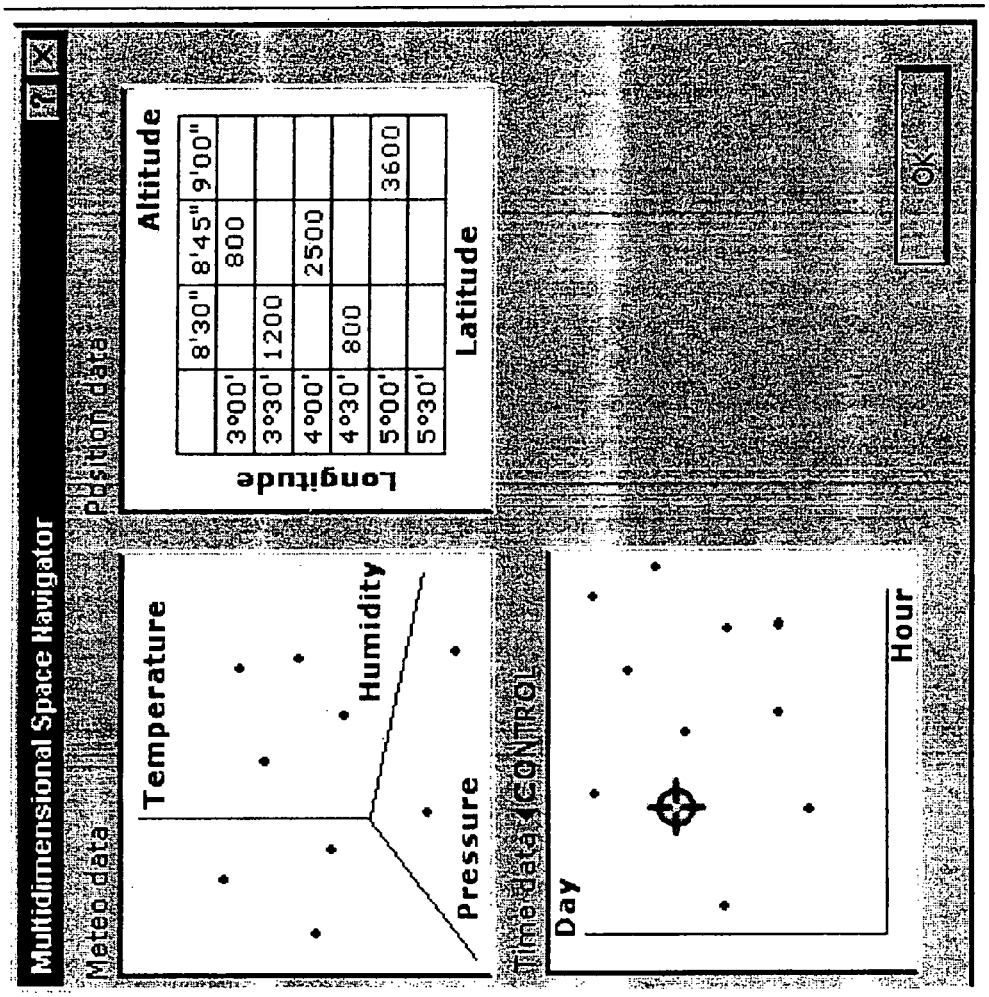

This leads us to the example of FIGS. 6 and 7. In this case, two time attributes: day and hour are the current conditional attributes and these are controlled by a module 44 and displayed in a "Time data" window corresponding to the window 44'. Six other display attributes are displayed in two windows "Meteo data" and "Position data" corresponding to respective instances of the window 46' and controlled by respective modules 46 and 46-2, FIG. 1, so representing 6-D data associated with each point in time. (As can be seen from the Position data window, different modules 46, 46-2 or even modules 44, 44-2 can be independently set to display attributes in any manner.) With the settings shown in FIGS. 6 and 7, the user clicks on any point in the time data window so causing the module to call the setAttributeValue method on the SQL generator 56 for both the day and hour attribute. The query is re-formulated and a relation comprising a plurality of objects each having six attributes returned. Each module 46 and 46-2 then displays its own three attributes for each object represented by a dot. (It will be seen that it may be desirable to colour code each dot so as to link the displayed object data in the Meteo data window with that of the Position data window.)

Using the extended interface mentioned above, the user may now decide to swap the conditional time attributes with the displayed meteo attributes or with the displayed position attributes and either have the SQL query automatically re-formulated by selecting a default set of attribute values within the new conditional attribute window or wait for the user to select such a point and so its set of attribute values before re-formulating the query. In any case, the user may as before select any single attribute and either change its state to a conditional or display attribute or swap it with another attribute.

It is conceded that where two or more modules are displaying conditional or display attributes, some arbitration may be required to decide which should display the newly swapped attribute and this can determined either by a program containing the modules 44, 44-2, 46, 46-2; by allocating a priority to each module or by any other suitable scheme.

In the embodiments, the modules 44 and 46 have been shown separately to illustrate that the invention is independent of the type of modules used. Notwithstanding the above examples, it should be seen that the modules 44 and 46 can be implemented as a single class especially where the functionality of the two are more interdependent.

It will therefore be seen that the invention allows a user to navigate inside a database even when the user does not have specific and well-defined criteria for searching. This approach, alone or in combination with the invention of GB9925741.2, is very useful in analysis, data mining, investigations, simulations, and other computer assisted activities where it is not possible to specify "a priori" a clear set of requirements but the final result is the consequence of a continuous interaction between the user and the machine.

As mentioned above, the invention can be used not only with databases, but also in cases where one or more attributes are calculated by for example a simulation tool. If all attributes are calculated, the SQL generator 56 is replaced completely by an interface to a simulation tool rather than a database. The simulation tool and the database might also be related each other in some cases. For example, a simulation tool could be used to forecast experimental results on meterological data, whereas the database shows the real measured data.

It is noted that SQL has been further developed into SQL3. SQL3 includes objects extensions where, in addition to the normal simple built-in types defined by SQL, complex user-defined types may also be defined, and these types may be used in the same way as built-in types. For example, columns in relational tables may be defined as taking values of user-defined types, as well as built-in types. The invention is therefore not limited to databases in which attributes contain simple data types.

What is claimed is:

1. A method for finding a query solution in a data space, the method comprising:
    performing an initial query in a database such that a sub-space within the data space is defined, wherein the initial query includes one or more conditional attributes and one or more display attributes; and
    searching for the solution outside the sub-space without performing another query; and
    wherein searching for the solution outside the sub-space without performing another query includes changing conditional attributes to display attributes and display attributes to conditional attributes.

2. The method of claim 1, wherein searching for the solution outside the sub-space without performing another query includes graphically navigating outside the sub-space.

3. The method of claim 1, wherein the initial query is a Structured Query Language (SQL) query.

4. A system for finding a query solution in a data space, the system comprising:
    an initial query in a database such that a sub-space within the data space is defined, wherein the initial query includes one or more conditional attributes and one or more display attributes; and
    a space navigator configured to search for the solution outside the sub-space without performing another query; and
    wherein the space navigator is further configured to change conditional attributes to display attributes and display attributes to conditional attributes.

5. The system of claim 4, wherein the space navigator is further configured to graphically navigate outside the sub-space.

6. The system of claim 4, wherein the initial query is a Structured Query Language (SQL) query.

7. A computer program product embodied in a tangible media comprising:
    computer readable program codes coupled to the tangible media for finding a query solution in a data space, the computer readable program codes configured to cause the program to:
    perform an initial query in a database such that a sub-space within the data space is defined, wherein the initial query includes one or more conditional attributes and one or more display attributes; and
    search for the solution outside the sub-space without performing another query; and
    wherein the computer readable program code configured to search for the solution outside the sub-space without performing another query includes computer readable program code configured to change conditional attributes to display attributes and display attributes to conditional attributes.

8. The computer program product of claim 7, wherein the computer readable program code configured to search for the solution outside the sub-space without performing another query includes computer readable program code configured to graphically navigate outside the sub-space.

9. The computer program product of claim 7, wherein the initial query is a Structured Query Language (SQL) query.

* * * * *